United States Patent
Sivasubramaniam et al.

(10) Patent No.: US 8,314,529 B2
(45) Date of Patent: Nov. 20, 2012

(54) COIL ASSEMBLY FOR AN ELECTRIC MACHINE

(75) Inventors: Kiruba Sivasubramaniam, Clifton Park, NY (US); Patrick Lee Jansen, Scotia, NY (US); Gary Randall Barnes, Delanson, NY (US); Jessica Mary Brower, Colonie, NY (US); Stephen Bertram Johnson, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 344 days.

(21) Appl. No.: 12/288,605

(22) Filed: Oct. 22, 2008

(65) Prior Publication Data

US 2010/0096944 A1    Apr. 22, 2010

(51) Int. Cl.
 *H02K 3/12*   (2006.01)
 *H02K 3/28*   (2006.01)
(52) U.S. Cl. ........................ 310/208; 310/201
(58) Field of Classification Search .............. 310/201, 310/208, 195, 198, 203; *H02K 3/00, 3/04, H02K 3/12, 3/28*
See application file for complete search history.

(56) References Cited

U.S. PATENT DOCUMENTS

| 3,961,864 | A | * | 6/1976 | Papst et al. | 310/91 |
| 5,587,619 | A | * | 12/1996 | Yumiyama et al. | 310/201 |
| 6,894,418 | B2 | | 5/2005 | Jones et al. | 310/208 |
| 7,183,678 | B2 | | 2/2007 | Sivasubramaniam et al. | 310/64 |
| 7,190,101 | B2 | * | 3/2007 | Hirzel | 310/268 |
| 7,262,537 | B2 | | 8/2007 | Worley et al. | 310/179 |
| 7,269,890 | B2 | * | 9/2007 | Nagano et al. | 310/179 |
| 2007/0103027 | A1 | * | 5/2007 | Jansen et al. | 310/266 |
| 2008/0007133 | A1 | * | 1/2008 | Onimaru et al. | 310/208 |

FOREIGN PATENT DOCUMENTS

| JP | 02-242531 | 9/1990 |
| JP | 06-119826 | 4/1994 |
| JP | 2000-090747 | 3/2000 |

OTHER PUBLICATIONS

John S. Glaser and Michael A. de Rooij, "A Novel Folded Ribbon Cable for Magnetic Components", 8 pages, General Electric Global Research, 1 Research Circle, Niskayuna, NY 12309, USA.

* cited by examiner

*Primary Examiner* — Quyen Leung
*Assistant Examiner* — Michael Andrews
(74) *Attorney, Agent, or Firm* — Ann M. Agosti

(57) ABSTRACT

A technique for winding multi-turn, stranded wire coils using rectangular cables avoids the risk of damage associated with edge-wise bends.

11 Claims, 2 Drawing Sheets

COIL ASSEMBLY FOR AN ELECTRIC MACHINE

BACKGROUND

The invention relates generally to coils for electric machines, and more particularly to a technique for winding rectangular Litz coils without risk of damage associated with edge-wise bends.

Rectangular coils such as field winding coils for electric machines are traditionally wound with the planar surface of the wider faces perpendicular to the orientation or radial direction of the coil slots in order to minimize AC losses associated with slot leakage. These traditional coil winding techniques result in turns having difficult edge-wise bends of the coil conductor(s). Such coil winding techniques also present challenges when winding coils using insulated conductors.

It would be advantageous to provide a technique for winding coils for electric machines that overcomes the disadvantages described above associated with traditional coil winding techniques for electric machines.

BRIEF DESCRIPTION

Briefly, in accordance with one embodiment of the invention, a coil assembly for an electric machine comprises a stranded wire cable configured with no more than one crossover turn interconnecting a first plurality of overlapping turns and a second plurality of overlapping turns such that the first plurality of overlapping turns axially abuts the second plurality of overlapping turns.

According to another embodiment of the invention, a coil assembly for an electric machine comprises:

an electric machine comprising at least one of a rotor tooth or a stator tooth; and a coil assembly comprising a stranded wire cable, the stranded wire cable configured with only one crossover turn interconnecting a first plurality of overlapping turns and a second plurality of overlapping turns, wherein the first plurality of overlapping turns and the second plurality of overlapping turns are positioned around the at least one tooth such that the first plurality of overlapping turns axially abuts the second plurality of overlapping turns, and further such that the first plurality of overlapping turns and the second plurality of overlapping turns are disposed from one another in the radial direction of the at least one tooth.

According to yet another embodiment of the invention, a method of winding a coil assembly for an electric machine comprises:

providing a stranded wire cable; and winding the stranded wire cable into a single crossover turn interconnecting a first plurality of overlapping turns comprising a first coil assembly lead and a second plurality of overlapping turns comprising a second coil assembly lead such that the first plurality of overlapping turns axially abuts the second plurality of overlapping turns.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Litz wire is a special type of wire used in electronics. Litz wire consists of many thin wires, individually coated with an insulating film and twisted together, following a carefully prescribed pattern into several levels. The combined conductor has greater surface area than a solid conductor and, because of the twist pattern, the magnetic current flowing in the strands are in directions such that they have a reduced tendency to generate an opposing e.m.f. in the other strands. The skin effect power losses associated with high frequency applications are therefore reduced. The ratio of distributed inductance to distributed resistance is increased relative to a solid conductor, resulting in a higher Q factor at these frequencies.

Litz wire is used to make inductors and transformers for high frequency applications where the skin effect is more pronounced and proximity effect can be an even more severe problem. Litz wire is one kind of stranded wire, but, in this case, the reason for its use is not the usual one of avoiding complete wire breakage due to material fatigue.

The present inventors recognized however, a technique for winding rectangular stranded wire coils such as Litz coils that avoids the risk of damage associated with edge-wise bends. The technique along with associated winding structures according to particular embodiments are described below with reference to the Figures.

Turns of solid core rectangular wire used to form coils within electric machine rotor or stator slots are traditionally wound in an edge-wise fashion such that the wide faces of the solid core rectangular wire are perpendicular to the radial orientation of the slot to minimize AC losses from slot leakage. Such traditional coil turns result in difficult edge-wise bends of the conductor, and challenges with winding coils with insulated conductors, as stated above.

Figure 1:
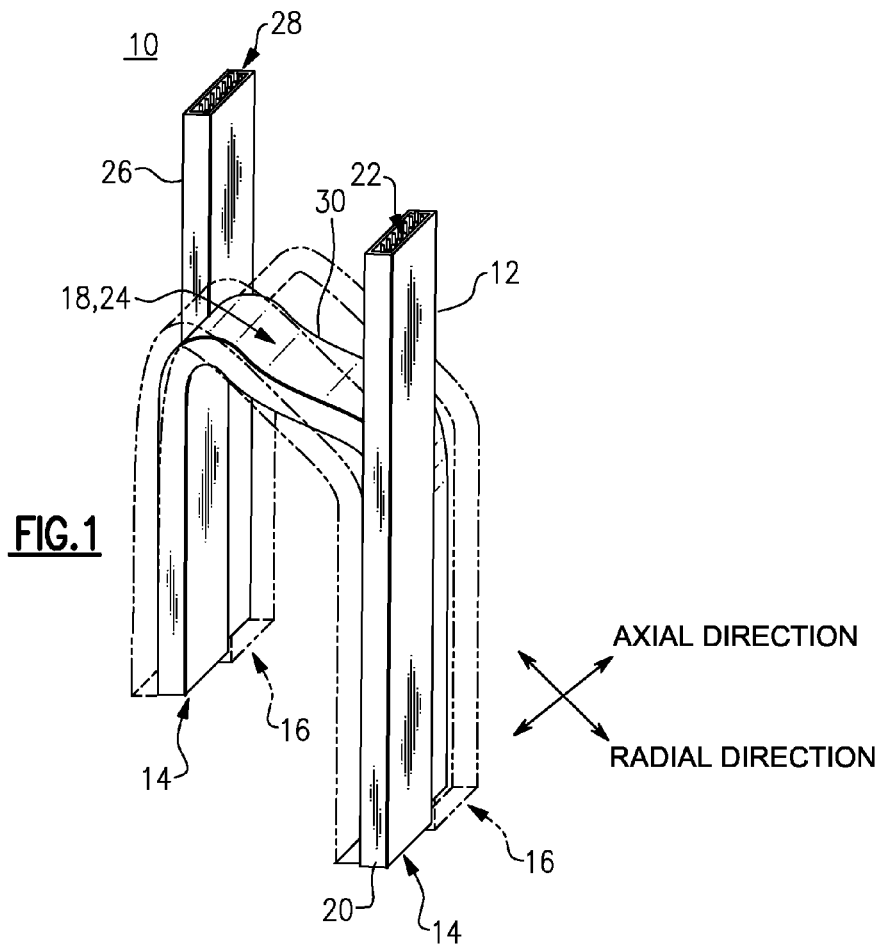
FIG. 1 is a perspective view illustrating one portion of a coil assembly for an electric machine according to one embodiment of the invention.

Looking now at FIG. 1, a perspective view illustrating one portion of a coil assembly 10 for an electric machine is depicted according to one embodiment of the invention. According to one aspect of the invention, the coil assembly 10 shown in FIG. 1 utilizes a rectangular stranded wire cable that could be, for example, a Litz cable 12 to reduce AC losses. The stranded/Litz coils constructed from the rectangular stranded/Litz cable 12 have turns oriented in the wider face-wise direction via wider face-wise bends, thereby removing the need for more traditional edge-wise bends, as described in further detail below with reference to FIG. 2. Stranded/Litz cable 12 is configured as two rows of coils 14, 16. Row 14 has an inner-most layer 18, an outer-most layer 20, and an end lead 22, while row 16 has an inner-most layer 24, an outer-most layer 26, and an end lead 28. The present inventors recognized that use of stranded/Litz cable 12 advantageously reduces AC losses from eddy and circulating currents due to slot leakage, radial fringe fields and proximity effects within the slots of an electric machine regardless of the orientation of the turns. Using this benefit, coils 14, 16 are wound with the wider planar face surfaces of the rectangular cable oriented in the radial direction of the electric machine coil slots, as opposed to the traditional tangential orientation.

The two rows of coils 14, 16 are formed, according to one embodiment, by starting from one of the inner-most layers 18, 24 and winding the first row 14 in one direction and the second row 16 in the opposite direction subsequent to completion of the first row 14. All bends are then made in the easy-turn (face-wise) direction of the rectangular cross-sectioned cable 12 to facilitate easy manufacture with pre-insulated turns. According to one embodiment, a single cross-over turn 30 is the only turn that is common to both inner-most layers 18, 24 and is the only cross-over turn required for the coil assembly 10.

Figure 2:
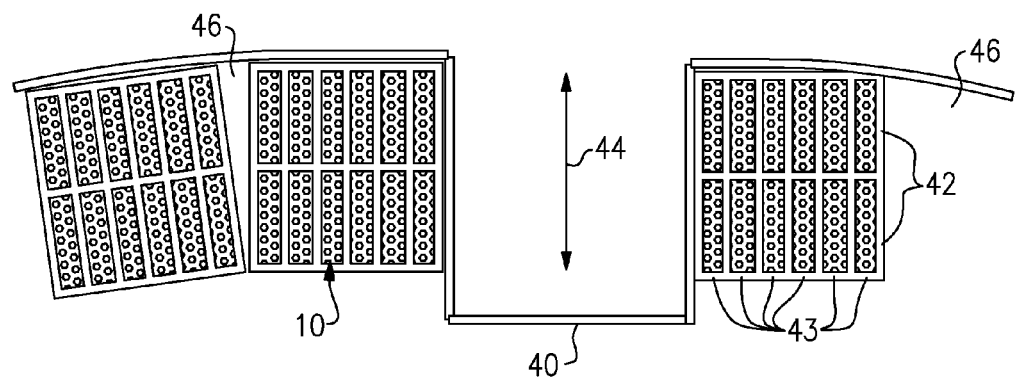
FIG. 2 is a diagram illustrating a plurality of the coil assemblies shown in FIG. 1 configured together with a tooth portion of an electric machine to provide coils stacked in the radial direction of the tooth according to one embodiment of the invention.

FIG. 2 is a diagram illustrating a plurality of coil assemblies 10 positioned around a rotor or stator tooth 40 of an electric machine. This structure provides coil turns formulated from a rectangular Litz cable comprising face portions 42 and side or edge portions 43. Planar surfaces of the wider face portions 42 of the Litz cable are oriented in the radial direction 44 of the tooth 40 while continuing to reduce AC losses from eddy and circulating currents due to slot leakage, radial fringe fields and proximity effects within the slots 46 of the electric machine according to one embodiment of the invention.

Figure 3:
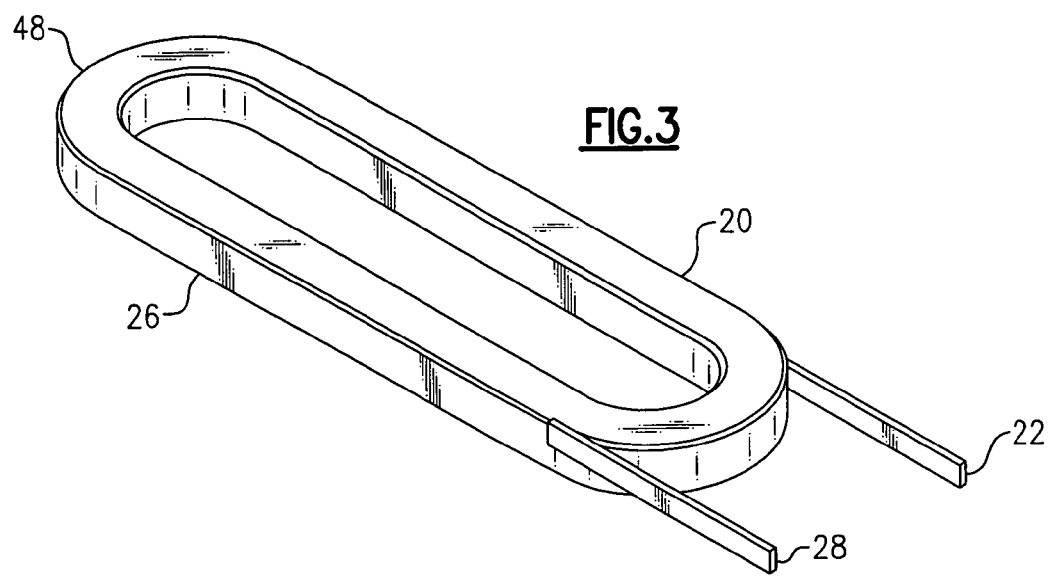
FIG. 3 is a pictorial view illustrating a complete coil assembly according to one embodiment of the invention.

FIG. 3 is a pictorial view illustrating a complete coil assembly 10 according to one embodiment of the invention. Coil assembly 10 is constructed according to one embodiment using a gentle edge-wise bend 48 at the beginning of the inner-most stranded/Litz cable turns 18, 24 described above. Subsequent coil turns are constructed without using further edge-wise bends to construct each individual row 14, 16 in succession. Use of a single slight edge-wise bend advantageously reduces the risk of damage to a stranded/Litz cable insulated with mica tape or other insulation caused by multiple edge-wise bends.

Coil assembly 10 advantageously is constructed without use of joints to manufacture multi-turn coils 14, 16. Coil assembly 10 further advantageously provides a structure having both coil leads 22, 28 exiting the coil assembly 10 via the outer rows/layers 20, 26. The coil winding techniques and structures described above according to particular embodiments, provide for low loss AC coils without high manufacturing costs to allow production of high performance machines at low costs.

Figure 4:
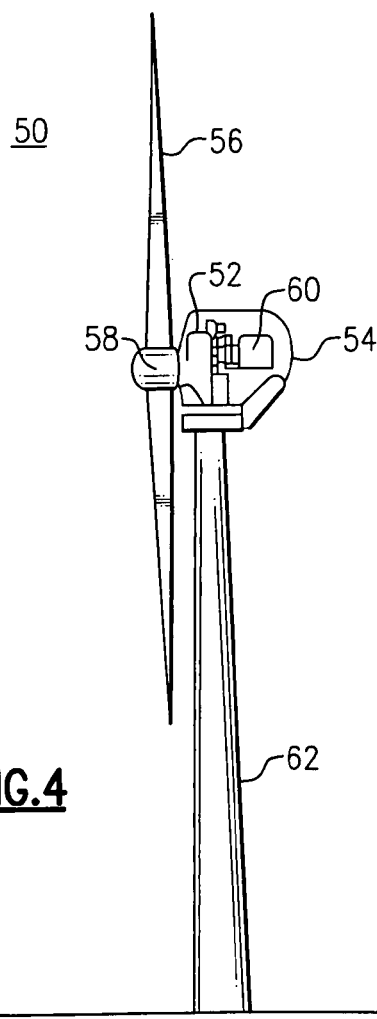
FIG. 4 illustrates a wind turbine including a medium speed electrical generator that employs the coil assembly depicted in FIG. 3, according to one embodiment of the invention.

Coil assembly 10 is useful in applications such as generator/motor applications where AC losses are an issue. Such applications can include, without limitation, tooth-wound electric machines for high torque density applications such as medium speed wind generators. FIG. 4 illustrates a wind turbine 50 including an epicyclic gear transmission unit 52 housed with and supported by a nacelle 54 in which a gear transmission unit 52 acts to transmit torque from rotor blades 56 and rotor hub 58 to a medium speed electrical generator 60 that employs coil assembly 10. A wind turbine tower 62 supports the gear transmission unit 52, nacelle 54, rotor blades 56, rotor hub 58 and generator 60.

The construction techniques described above with reference to particular embodiments further provide a practical way to manufacture coils for applications with potential for high AC losses using standard design/manufacturing processes. Although AC losses can be reduced by using stranded/Litz cables, manufacturing of coils using known coil designs becomes more challenging, especially while maintaining dielectric integrity of the turns. The structures and techniques described above with reference to particular aspects of the invention overcome these challenges.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A coil assembly for an electric machine, the coil assembly comprising a stranded wire cable, the stranded wire cable configured with no more than one crossover turn interconnecting a first plurality of turns overlapping along a radial direction of the coil assembly, and a second plurality of turns overlapping along the radial direction of the coil assembly, such that the first plurality of turns and the second plurality of turns abut each other along an axial direction of the coil assembly.

2. The coil assembly according to claim 1, wherein the no more than one crossover turn is an inner-most turn common to the first plurality of turns and the second plurality of turns.

3. The coil assembly according to claim 1, wherein the stranded wire cable is a rectangular Litz cable comprising a pair of opposing wide planar faces and a pair of narrow planar faces orthogonal to the wide planer faces.

4. The coil assembly according to claim 3, wherein each overlapping turn is bent in a wide planar face-wise direction to generate the overlapping coil turns.

5. The coil assembly according to claim 1, wherein the electric machine comprises a wind turbine electrical generator.

6. The coil assembly according to claim 1, wherein the first plurality of turns is wound in a first direction and the second plurality of turns is wound in a direction opposite to the first direction.

7. An electric machine, comprising:
at least one of a rotor tooth or a stator tooth; and
a coil assembly comprising a stranded wire cable, the stranded wire cable configured with only one crossover turn interconnecting a first plurality of turns overlapping along a radial direction of the coil assembly, and a second plurality of turns overlapping along the radial direction of the coil assembly, wherein the first plurality of turns and the second plurality of turns are positioned around the at least one tooth such that the first plurality of turns and the second plurality of turns abut each other along an axial direction of the coil assembly, and further such that the first plurality of turns and the second plurality of turns are disposed from one another along a radial direction of the at least one tooth.

8. The coil assembly according to claim 7, wherein the stranded wire cable is a rectangular Litz cable comprising a pair of opposing wide planar faces and a pair of narrow planar faces orthogonal to the wide planar faces.

9. The coil assembly according to claim 8, wherein each overlapping turn is bent in a wide planar face-wise direction to generate the overlapping coil turns such that the plane of each wide planar face is oriented parallel to the radial direction of the at least one tooth.

10. The coil assembly according to claim 7, wherein the only one cross-over turn is configured as a shared portion of an inner-most turn common to the first plurality of turns and the second plurality of turns.

11. The coil assembly according to claim 7, wherein the electric machine comprises a wind turbine electrical generator.

* * * * *